United States Patent
Carino

[15] 3,644,796
[45] Feb. 22, 1972

[54] ELECTROLYTIC CAPACITOR HAVING INTEGRAL BLEEDER RESISTOR

[72] Inventor: John W. Carino, Columbia, S.C.
[73] Assignee: General Electric Company
[22] Filed: Jan. 4, 1971
[21] Appl. No.: 103,527

[52] U.S. Cl. .............................. 317/230, 317/242
[51] Int. Cl. .............................. H01g 1/02, H01g 9/00
[58] Field of Search .............. 317/230, 231, 232, 233, 242

[56] References Cited

UNITED STATES PATENTS

| 2,611,040 | 9/1952 | Brunetti | 317/101 X |
| 3,198,997 | 8/1965 | Fabricius | 317/230 |
| 3,273,027 | 9/1966 | Bourgault et al. | 317/230 |

*Primary Examiner*—James D. Kallam
*Attorney*—Nathan J. Cornfeld, John P. Taylor, Frank L. Neuhauser, Oscar B. Waddell and Joseph B. Forman

[57] ABSTRACT

An electrolytic capacitor is provided having an integral bleed resistor therein to eliminate the need for an external resistor. The internal bleed resistor is provided by constructing the cover of the capacitor from which the leads protrude of a material which is slightly conductive. Carbon-filled plastics can be used to form the slightly conductive cover.

5 Claims, 2 Drawing Figures

PATENTED FEB 22 1972　　　　　　　　　　　　　　3,644,796

INVENTOR:
JOHN W. CARINO,
BY John R. Taylor
HIS ATTORNEY.

ELECTROLYTIC CAPACITOR HAVING INTEGRAL BLEEDER RESISTOR

BACKGROUND OF THE INVENTION

This invention relates to capacitors and more particularly to electrolytic capacitors requiring a bleed resistor to leak off the charge on the capacitor.

Electrolytic capacitors, particularly those of high capacitance, are usually provided with an external bleed resistor to leak off the charge when the capacitor is not in use. The bleed resistor is usually provided for safety purposes; therefore, a high enough resistance is usually selected to minimize the possibility of the resistor interfering the normal use of the capacitor. The addition of a bleed resistor either by the manufacturer or the user increases the cost of the product not only due to the added cost of the resistor but the added labor of manually attaching the resistor to the capacitor leads. In some instances, the physical size of the resistor and its leads can even interfere with the subsequent mounting of the capacitor.

It is therefore an object of this invention to provide a capacitor construction which does not require the use of an external bleed resistor but allows the charge on the capacitor to slowly leak off without materially raising the leakage or dissipation factor of the capacitor. Other objects of the invention will be apparent from the accompanying description and drawings.

SUMMARY OF THE INVENTION

In accordance with the invention, an electrolytic capacitor is provided with a cover member upon which the leads are mounted which is constructed of slightly conductive material thereby enabling accumulated charge on the capacitor to be leaked off by providing a leakage path between the leads of the capacitor.

DESCRIPTION OF THE PREFERRED EMBODIMENT

Figure 1:
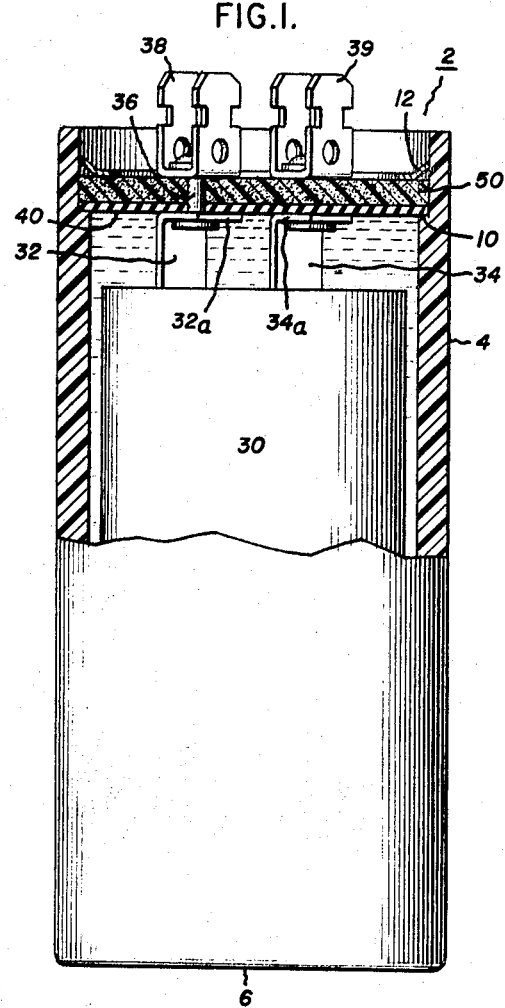
FIG. 1 is a partially broken away vertical view of the invention.
Figure 2:
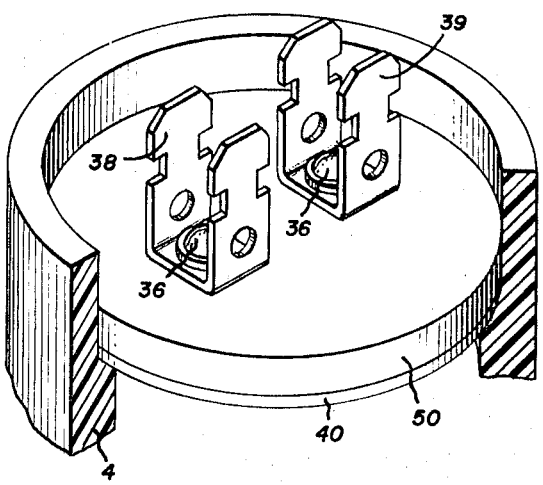
FIG. 2 is an isometric view of a portion of the invention.

Referring now to FIG. 1, an electrolytic capacitor is generally indicated at 2 comprising a tubular case 4 having an integral end wall 6. Case 4 is preferably constructed of a rigid insulating material such as a hard rubber of a plastic material. Alternatively, however, case 4 may be constructed of metal. Case 4 is interiorly provided with an annular shoulder 10 to mount a capacitor section 30 within case 4. Capacitor section 30 comprises a roll of convolutely wound, film-forming metal electrode foils separated by paper or other dielectric material and forms no part of the present invention. The electrode foils are connected to lead members numbered 32 and 34, respectively. Lead members 32 and 34 have portions 32a and 34a which have been bent at approximately right angles to the portions of leads 32 and 34 leading from capacitor section 30. Mounted on top of these bent-over portions 32a and 34a is a rubber sealing washer 40 and a plastic washer 50. Rubber sealing washer 40 and plastic washer 50 may be bonded together if desired. A pair of rivets 36 pass through appropriate openings in washers 40 and 50 to connect portions 32a and 34a, respectively, with terminal members 38 and 39 thus retaining roll 30 and washers 40 and 50 together as an assembly. The assembly is inserted into casing 4 so that washer 40 sealingly butts against shoulder 10 to provide a seal for the liquid electrolyte within casing 4. A retaining ring 12 is then placed atop washer 50 as by a press fit to retain the capacitor assembly within casing 4.

Rubber washer or layer 40, as mentioned above, provides a seal to prevent any of the electrolyte within the capacitor from escaping. Washer 40, being constructed of rubber is, of course, an insulator and thus while both terminals 32a and 34a are attached thereto and the rivets 36 pass through the washer no discharge occurs.

Plastic layer 50, in accordance with the invention, provides a slightly conductive path between the two terminals of the capacitor. Plastic layer 50 preferably comprises a carbon-filled plastic material such as, for example, polypropylene. Other materials can, of course, be also used providing they possess the desired electrical and mechanical properties. From an electrical standpoint, the material must be neither a good conductor nor a good insulator if it is to function in accordance with the invention.

The dimensions of layer 50 as well as the positions of lead members 32 and 34 also will affect the resistance obtained. In this connection it should be noted that the amount of resistance is controlled not only by the parameters of thickness of layer 50 and spacing of member 32 and 34 but also by the overall diameter of layer 50 as well since layer 50, in effect, acts as a plurality of parallel resistors.

By way of illustration, layer 50 may be constructed of carbon-filled polypropylene and dimensioned to provide a cover of approximately 1.6-inch diameter with about 0.6-inch spacing between the electrodes and a thickness of from about 80 to about 200 mils to provide a resistance range of from about 5,000 to about 20,000 ohms. This provides a sufficiently small resistance to enable the accumulated charge to leak off via the conductive path provided between the terminals of the capacitor yet a high enough resistance to prevent the electrical shorting of the capacitor. Obviously, therefore, from an electrical standpoint the thickness and diameter of the material and the resistance of the material are interrelated and therefore the physical dimensions as well as the resistivity for a given material are selected from an electrical standpoint to provide the proper bulk resistance.

The material selected must be sufficiently rigid to allow connection of terminals 38 and 39 to terminals 32a and 34a via rivets 36 without an undue amount of flow of the plastic material. Similarly, the material must be capable of withstanding any pressures or stresses placed thereon by rivets 36 or ring 12 pressed thereon. Such mechanical requirements may dictate the thickness of conductive layer 50. When this is the case, the conductivity of the material can be suitably altered, for example, when using carbon filler by altering the amount of carbon filler used.

It should be noted that although the use of a filled plastic material such as carbon-filled or silver-filled plastics is preferred, other materials which are presently not in as widespread use such as a conductive polymer can also be used in the invention. The main requirements are that the electrical resistance be within the preferred range and that the polymer possess the requisite mechanical strength necessary for the construction used therein.

Examples of materials that can be used therefore include, for example, filled polyolefins, phenolics, silicones, vinyls, urethanes, epoxy resins, and polyester resins. The conductive fillers that can be used in such polymers include, for example, graphite, acetylene black, silver, and silver-coated copper. Other plastic materials which may be found to be useful in the invention may include conductive polymers such as polymers containing tetracyanoquinodimethane (TCNQ) which has been found to impart conductivity when incorporated into a polymer. Of particular interest are the conducting phenolics since they provide a moldable, yet rigid, material and their use as conducting materials, for example, in resistors, has been investigated by others.

In the actual practice of the invention, the resistance of the layer 50 may be varied during the manufacturing process by the alternate use of several different stock materials having different amounts of conductive loading, or by the use of different thicknesses of the material to thereby impart different resistance values within the desired range.

Thus, my invention provides an improved construction for a compact and economical capacitor, particularly an electrolytic capacitor, having high charge capabilities and having integral bleed discharge means therein by which an accumulated charge in the capacitor can be safely bled off without the need for an added external bleed resistor thereon.

What is claimed is:

1. An improved electrolytic capacitor comprising a casing, a capacitor section including capacitor electrodes in the casing, a cover member on said casing, capacitor terminals protruding from said cover member, said electrodes being electrically connected to said terminals respectively and said cover member consisting of an electrically resistive material for electrically interconnecting said terminals and bleeding off accumulated charge within the capacitor.

2. The capacitor of claim 1 wherein said cover member has effective resistance between said terminal members of from about 5,000 to about 20,000 ohms.

3. The capacitor of claim 1 wherein said cover member comprises a conductive plastic material having effective resistance between said terminals of from about 5,000 to about 20,000 ohms.

4. The capacitor of claim 3 wherein said conductive plastic material comprises a carbon-filled plastic selected from the group consisting of polyolefins, phenolics, silicones, vinyls, urethanes, epoxy resins, and polyester resins.

5. An electrolytic capacitor having a casing, a capacitor section including electrodes in the casing, a cover on said casing carrying spaced terminals extending therefrom, said electrodes being electrically connected respectively to said terminals, and said cover sealing said casing and consisting essentially of a partially conductive material having a resistance related to the distance between said terminals for bleeding off the accumulated charge on said capacitor.

* * * * *